United States Patent [19]

Kamiyama

[11] Patent Number: 4,690,768

[45] Date of Patent: Sep. 1, 1987

[54] PROCESS FOR THE PREPARATION OF FERRITE MAGNETIC PARTICULATE FOR MAGNETIC RECORDING

[75] Inventor: Kouzi Kamiyama, Kaisei, Japan

[73] Assignee: Fuji Photo Film Co., Ltd., Japan

[21] Appl. No.: 794,476

[22] Filed: Nov. 4, 1985

Related U.S. Application Data

[63] Continuation of Ser. No. 580,161, Feb. 14, 1984, abandoned.

[30] Foreign Application Priority Data

Feb. 16, 1983 [JP] Japan .................. 58-24255

[51] Int. Cl.$^4$ .................................. C04B 35/26
[52] U.S. Cl. .................. 252/62.58; 252/62.59; 252/62.62; 252/62.63; 264/DIG. 58
[58] Field of Search ............... 252/62.58, 62.59, 62.62, 252/62.63; 264/DIG. 58

[56] References Cited

U.S. PATENT DOCUMENTS

| | | | |
|---|---|---|---|
| 4,120,807 | 10/1978 | Watanabe et al. | 252/62.63 |
| 4,233,169 | 11/1980 | Beall et al. | 252/62.64 |
| 4,341,648 | 7/1982 | Kubo et al. | 252/62.63 |
| 4,407,721 | 10/1983 | Koike et al. | 252/62.63 |
| 4,411,807 | 10/1983 | Watanabe et al. | 252/62.63 |
| 4,493,779 | 1/1985 | Kamiyama | 252/62.63 |
| 4,493,874 | 1/1985 | Kubo et al. | 252/62.63 |
| 4,543,198 | 9/1985 | Kamiyama | 252/62.63 |
| 4,551,260 | 11/1985 | Hayakawa et al. | 252/62.6 |
| 4,569,775 | 2/1986 | Kubo et al. | 252/62.63 |

*Primary Examiner*—Stephen J. Lechert, Jr.
*Attorney, Agent, or Firm*—Gerald J. Ferguson, Jr.; Michael P. Hoffman; Ronni S. Malamud

[57] ABSTRACT

A process for the preparation of a ferrite magnetic particulate for magnetic recording which comprises steps of: (1) melting a starting material mixture containing a basic component for hexagonal ferrite, a coercive force-reducing component and a glass-forming component; (2) rapidly cooling the resulting molten mixture to obtain an amorphous material; (3) heat-treating said amorphous material to form ferrite crystals; and (4) removing components other than the ferrite crystals from the material resulting from said heat-treatment:

characterized in that a step for pulverizing said amorphous material and/or a step of pulverizing said heat-treated amorphous material are included in advance of the above step (4).

6 Claims, No Drawings

PROCESS FOR THE PREPARATION OF FERRITE MAGNETIC PARTICULATE FOR MAGNETIC RECORDING

This is a continuation of application Ser. No. 580,161, filed Feb. 14, 1984, now abandoned.

BACKGROUND OF THE INVENTION

1. Field of the Invention

The present invention relates to a process for the preparation of a ferrite magnetic particulate for magnetic recording, and more particularly relates to a finely divided ferrite magnetic material, which is suitable for use in perpendicular magnetic recording system.

2. Description of Prior Arts

Heretofore, there has been used a magnetic recording system wherein a recording medium such as magnetic recording tape is magnetized along its longitudinal direction in the surface area thereof. A perpendicular magnetic recording system has been recently proposed for accomplishing high density magnetic recording, and various magnetic mediums for use in this system are under study.

There are known methods wherein a magnetic material layer is formed on a substrate (i.e., support) such as a film by a sputtering process, a vacuum deposition process, etc. as the method of preparing the magnetic recording medium for use in the perpendicular magnetic recording system. For example, there has been developed a magnetic recording medium wherein a layer of a magnetic material such as cobalt-chromium is formed on a substrate by the sputtering process.

However, the process for preparing the magnetic recording medium utilizing said sputtering process or vacuum deposition process has disadvantages in productivity and product quality as compared with conventional process for preparing the magnetic recording medium utilizing the conventional coating process. Accordingly, methods utilizing the coating process are also studied as the process for preparing the magnetic recording medium for use in the perpendicular magnetic recording system.

For example, there has been proposed a process for preparing the magnetic recording medium for use in the perpendicular magnetic recording system wherein a hexagonal ferrite such as hexagonal barium ferrite in the form of fine particles having a hexagonal plate shape is used as magnetic material, the hexagonal ferrite is mixed with and dispersed in a resin (binder) and the surface of a substrate is coated with the ferrite.

As typical processes for preparing the hexagonal ferrite such as hexagonal barium ferrite used as the magnetic particulate for the above-mentioned magnetic recording medium, there are known wet processes (such as a co-precipitation process and a hydrothermal synthetic process), a vitrification process, etc.

The present invention provides an improved process for the preparation of hexagonal ferrite magnetic particulate by the vitrification process.

The preparation of the hexagonal ferrite magnetic material by the vitrification process is generally carried out in the process comprising steps of:

(1) melting a starting material mixture containing a basic component for hexagonal ferrite, a coercive force-reducing component and a glass-forming component, (2) rapidly cooling the resulting molten mixture to obtain an amorphous material, (3) heat-treating said amorphous material to form ferrite crystals, and (4) removing components other than the ferrite crystals from the material resulting from said heat-treatment.

In summary, the process comprises the following steps. A mixture of starting materials containing the desired ferrite component and a glass-forming component is melted and then rapidly cooled to form an amorphous material which is then heat-treated as such to form and deposit hexagonal ferrite crystals therefrom, and other materials such as glass component, etc. than the ferrite crystals are removed from the material obtained from the above heat treatment (hereinafter referred to as heat-treated material).

The ferrite magnetic material in the shape of hexagonal plate, which is suitable for use in the perpendicular magnetic recording system, is in the form of fine particle wherein the diameter of the hexagonal plate is 0.1 $\mu$m or below and the thickness thereof is 0.03 $\mu$m or below. However, the conventional vitrification process is liable to produce ferrite magnetic particulate in the form of agglomerated mass because of presence of a small amount of substances other than the ferrite crystals. Accordingly, the satisfactorily dispersible ferrite fine particulate is hardly obtained in a high yield by the vitrification process.

For the reasons described above, Japanese Patent Provisional Publication No. 57(1982)-56328 discloses a process including, after the aforementioned fourth step, namely, the process for removing components other than the ferrite crystals from the materials resulting from the heat-treatment, a step for pulverizing the obtained particles (including particles in the form of agglomerated mass) in a wet pulverizer, whereby enhancing the dispersibility of the obtained ferrite particulate.

As a result of study of the present inventor, however, it has been noted that the pulverization of the particles after removal of the glass component is liable to damage the ferrite crystals even in the wet pulverizing process. Further, even if the damage of the ferrite crystals is brought about partly, there is introduced into the ferrite magnetic particulate a practically unfavorable decrease of magnetic property such as reduction of saturation magnetization and residual magnetization, and elevation of coercive force. More in detail, a magnetic recording medium containing such magnetic particulate as having reduced saturation and residual susceptibilities shows decrease of saturation magnetic flux as well as residual magnetic flux. Such decrease of the magnetic flux is unfavorable, because it brings about decrease of strength of an electric signal provided thereby. The elevation of coercive force in the magnetic particulate unfavorably increase the coercive force of the magnetic recording medium.

It may be assumed that the damage of ferrite crystals can be avoided by employing a shortened pulverization period or a mild pulverizing condition. However, these processes are not effective to satisfactorily divide the agglomerated mass into single particles, and accordingly ot a small amount of agglomerated mass remains in the resulting ferrite magnetic particulate material. The magnetic material containing not a small amount of the agglomerated mass is hardly dispersed in a binder uniformly, resulting in a heterogeneous coating dispersion. The heterogeneous dispersion is hardly coated on a substrate uniformly, and thus formed magnetic material-containing layer is made ununiform, resulting in decrease of various properties of the magnetic recording medium.

SUMMARY OF THE INVENTION

The present inventor have made study to provide an improved process to solve the problem in the process for the preparation of the magnetoplumbite type hexagonal ferrite magnetic particulate for magnetic recording utilizing the conventional vitrification process. As a result, the inventor has discovered that the above-mentioned problem is solved by providing a pulverization step for preventing agglomeration of the ferrite particulate in advance of the step for removing components other than the ferrite crystals from the heat-treated material.

Accordingly, the present invention provides a process for the preparation of a magnetoplumbite type ferrite magnetic particulate for magnetic recording which comprises steps of:

(1) melting a starting material mixture containing a basic component for hexagonal ferrite, a coercive force-reducing component and a glass-forming component, (2) rapidly cooling the resulting molten mixture to obtain an amorphous material, (3) heat-treating said amorphous material to form ferrite crystals, and (4) removing components other than the ferrite crystals from the material resulting from said heat-treatment;

characterized in that a step for pulverizing said amorphous material and/or a step for pulverizing said heat-treated amorphous material are included in advance of the step for removing components other than the ferrite crystals from the heat-treated material.

DETAILED DESCRIPTION OF THE INVENTION

The process of the present invention is characterized by rearranging the steps for the preparation of the ferrite magnetic particulate in such a manner that the pulverization step is carried out "before the step for removing components other than the ferrite crystals from the materials resulting from the heat-treatment of the amorphous material".

Therefore, various starting materials and treatment conditions employed in the conventional process for the preparation of the ferrite magnetic particulate can be adopted in the process of the present invention.

In the preferred embodiment of the starting material mixture for the ferrite in the present invention, said mixture contains each component constituting said mixture in such an amount that the amount of $B_2O_3 + SiO_2$ is from 20 to 40 molar %, that of RO is from 25 to 50 molar %, that of $Fe_2O_3$ is from 20 to 50 molar %, that of MO is from 2 to 10 molar %, and that of $M'O_2$ is from 2 to 10 molar % wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium.

In the above description, each component is expressed as oxide and the content thereof is expressed in terms of the oxide. However, each component may be used in the form of a compound or a salt capable of being converted into the above oxide under heating conditions in the first step (the step of melting the starting material mixture). For instance, $B_2O_3$ may be introduced in the form of boric acid into the mixture, and other metallic components in the form of a compound having a relatively low melting point such as carbonate or nitrate may be introduced into the mixture. More in detail, the term "$B_2O_3$ component" means to include $B_2O_3$ itself and compounds which are convertible to $B_2O_3$ under the heating condition in the first step. Also, the term "$SiO_2$ component" means to include $SiO_2$ itself and compounds which are convertible to $SiO_2$ under the heating condition in the first step.

The above-mentioned $B_2O_3$ component and $SiO_2$ component consist in the glass-forming component, in which the amount of the $SiO_2$ component preferably ranges from 0.05 to 0.8 (preferably from 0.1 to 0.5) in the molar ratio of $SiO_2/(B_2O_3+SiO_2)$. RO (in which R is at least one metal atom selected from the group consisting of barium, strontium and lead) and $Fe_2O_3$ are basic components of the hexagonal ferrite, and a preferable compound of RO is barium oxide in which R is barium.

MO (in which M is at least one divalent metal atom selected from the group consisting of cobalt, nickel and zinc) and $M'O_2$ (in which M' is at least one tetravalent metal atom selected from the group consisting of titanium, zirconium and hafnium) serve mainly as coercive force-reducing components.

The above-mentioned starting material mixture preferably contains platinum and/or gold in an amount ranging from 1 to 2,000 ppm based on the combined amount of the above $B_2O_3$, $SiO_2$, RO, $Fe_2O_3$, MO and $M'O_2$. The ferrite magnetic particulate prepared from the starting material mixture containing platinum and/or gold has a particle size distribution of particularly favorable narrow range. It is assumed that such platinum and/or gold serve as nucleous-forming reagent in the process of crystallization of the hexagonal ferrite crystals from the amorphous material.

The starting materials are thoroughly mixed together to obtain a starting material mixture for ferrite. The mixture is melted by heating it to a vicinity of the melting temperatures of the components, for example, at a temperature of from 1250° to 1400° C., and quenched to form an amorphous material.

According to the conventional process, thus obtained amorphous material is subsequently heat-treated to form and deposit magnetoplumbite type hexagonal ferrite crystals therefrom, and components such as glass component, etc. other than the ferrite crystals are removed from the heat-treated material by utilizing a treating technique such as etching treatment with an acid.

In the present invention, prior to the step for removing components other than the ferrite crystals from the heat-treated material, a step for pulverizing the amorphous material and/or said heat-treated material are performed. The pulverization step can be performed, for instance, by pulverizing the amorphous material prior to the heat-treatment thereof, by pulverizing the heat-treated material obtained by the heat-treatment of the amorphous material, or by pulverizing both the amorphous material and the heat-treated material.

Accordingly, the present invention is characterized in that the pulverization is performed on a glass containing substantially no ferrite crystals or on ferrite crystals in the presence of a great amount of other components such as the glass component.

The amorphous material obtained by rapidly cooling the molten starting material mixture is generally in the form of flake having width of 10–30 mm and thickness of 20–100 μm. The pulverization according to the present invention is performed on the amorphous material such as in the form of flake or other, or on the heat-treated material produced upon heat-treatment of the amorphous material. The pulverization can be performed before or after the heat-treatment for the production of ferrite crystals, or can be performed before and after the heat-treatment. The latter, that is, the pulverization before as well as after the heat-treatment is preferred.

The amorphous material having been subjected to no heat-treatment contains substantially no ferrite crystals therein. Accordingly, in the case that the pulverization is performed on the amorphous material prior to the heat-treatment, the pressure or shearing force applied on the amorphous material serves simply for pulverizing the amorphous material. Naturally, the pressure or shearing force gives no unfavorable effect to the later-produced ferrite crystals.

In contrst, inside and/or on the surface of the heat-treated material obtained by the heat-treatment of the amorphous material, ferrite crystals are produced and deposited. The pressure and shearing force of the pulverization applied on the heat-treated material containing ferrite crystals is effective mainly to break material such as glass component, residing around the ferrite crystals, and little damage is given to the ferrite crystals. Moreover, even after the amorphous material is finely divided, the pressure and shearing force hardly damages the ferrite crystals because the coating layers on the ferrite crystals, namely the coating layers of glass component, serve to cushion the pressure and shearing force. Accordingly, the pulverization applied on the heat-treated material in which ferrite crystals are deposited, damages the ferrite crystals only at a low level, so far as the glass component, etc. is present therewith.

The heat-treatment of the amorphous material to deposit the ferrite crystals is a conventional technique, and can be conducted, for example, by heating the amorphous material at a temperature of from 700° to 950° C.

There is no specific limitation on procedure of the pulverization. For instance, a known dry pulverization process and wet pulverization process are employable. There likewise is no specific limitation on apparatus for carrying out the pulverization procedure, so far as the apparatus is suitable for preparing fine particles from the amorphous material and/or the heat-treated material. Accordingly, any of various pulverizers such as a ball mill, an oscillating ball mill, a mortar, an automatic mortar, a crusher mill, and a pin mill can be utilized. In the case of the wet pulverization process is employed, a solvent such as an organic solvent (e.g., alcohol, acetone, etc.), water or a mixture thereof can be employed. However, in the case that the wet pulverization process is applied to the amorphous material prior to the heat-treatment, an aqueous solvent is preferably not employed, because a portion of the amorphous material is liable to dissolve in an aqueous solvent to alter the composition ratio of the amorphous material from the predetermined value. Accordingly, in this case an organic solvent is preferably employed.

The heat-treated material containing ferrite crystals obtained by the heat-treatment or the pulverization following the heat-treatment is then subjected to the step for removing components other than the ferrite crystals. This removal step can be performed by subjecting the heat-treated material to, for instance, etching process using an acid. In the case that the pulverization is performed following the heat-treatment, thus produced heat-treated material to be subjected to the etching process is in the form of fine particles. Even in the case that the pulverization is performed only prior to the heat-treatment, the heat-treated material to be subjected to the etching process is in the form of fine particles, provided that the heat-treatment is carried out at a such low temperature as to prevent fusion between the pulverized particles. The etching solution rapidly permeates into the heat-treated material in the form of fine particles, to favorably reduce the period required for the etching process. Also favorable is that the components residing between the ferrite crystals are efficiently removed.

The fine ferrite crystals obtained by conducting the above removal treatment of the glass component, etc. are subjected to a rinsing treatment and a drying treatment in a similar manner to that of conventional technique, whereby the desired magnetic material in the form of fine particles (magnetoplumbite type ferrite magnetic material for magnetic recording) can be obtained.

The ferrite magnetic particulate for magnetic recording which is prepared according to the present invention has received littele direct pulverization force applied in the process of the preparation thereof. Accordingly, the ferrite magnetic particulate is improved in the dispersibility and the damaged ferrite particles are contained only at a prominently reduced level.

Since the magnetoplumbite type ferrite magnetic particulate obtained according to the present invention is satisfactorily enhanced in the powder dispersibility, it is easy to disperse it in a binder, etc. to be employed in the production of a magnetic recording medium. This magnetic particulate-containing layer has a smooth surface and contains a uniformly dispersed magnetic particulate. For these reasons, the magnetic recording medium having such improved magnetic particulate-containing layer can run smoothly in even contact with a head of a magnetic recording-reproducing device. Thus, generation of noises in the magnetic recording and regenerative stages are reduced, and the regerative output increases.

Moreover, since the ferrite magnetic particulate prepared according to the present invention is improved in the dispersibility and contains damaged ferrite particles at a prominently reduced level, a magnetic recording medium shows satisfactory magnetic recording properties. More in detail, the ferrite magnetic particulate prepared by the process of the present invention shows practically satisfactory saturation magnetization, residual magnetization and coercieve force.

From the above-mentioned reasons, the ferrite magnetic particulate for magnetic recording obtained by the present invention is especially satisfactory as magnetic particulate for magnetic recording medium to be employed in the perpendicular magnetic recording system.

The present invention will be further illustrated by the following examples.

EXAMPLES 1–5

The $SiO_2$—$B_2O_3$—$BaO$—$Fe_2O_3$—$CoO$—$TiO_2$ combination was selected as a starting material combination for the preparation of hexagonal barium ferrite crystals by the vitrification process. Each component was so weighed to give the formulation as follows: $SiO_2$ 2 molar %; $B_2O_3$ 25 molar %; BaO 35 molar %; $Fe_2O_3$ 29 molar %; CoO 4.5 molar %; and $TiO_2$ 4.5 molar %. Further, $H_2[PtCl_6]\cdot 6H_2O$ was weighed to amount to 10 ppm per the total amount of the above components. These were then well mixed.

The starting material mixture was placed in a platinum crucible, and the mixture was heated and melted at the temperature of 1300°-1350° C. in a furnace of silicon carbide heater under stirring. Subsequently, the molten material was poured onto a pair of rolls of chromium-plated stainless steel from an orifice utilizing the air pressure so that the molten material was brought into contact with the surface of the roll for cooling. Thus, flaky material was obtained. An X-ray analysis indicated that the obtained flaky material was essentially amorphous material.

The amorphous material was then subjected to pulverization prior to the heat-treatment for production of ferrite crystals or pulverization prior to and after the heat-treatment, in the manner as set forth in Table 1. The particle size of the particles produced by the pulverization was measured by means of sieves. The results are also set forth in Table 1, in which the value means that the particles passed through the sieve of such mesh. For instance, the value "170" means that most particles passed through the sieve of "170" mesh.

TABLE 1

| Example | Pulverization Conditions | Particle Size |
|---|---|---|
| 1 | 4 hours prior to heat-treatment (automatic mortar) | 170 |
| 2 | 4 hours prior to heat-treatment (automatic mortar) + 1 hour after heat-treatment (automatic mortar) | 200 |
| 3 | 20 hours prior to heat-treatment (automatic mortar) + 1 hour after heat-treatment (automatic mortar) | 325 |
| 4 | 20 hours prior to heat-treatment (automatic mortar) + 10 hours after heat-treatment (automatic mortar) | 400 |
| 5 | 20 hours prior to heat-treatment (automatic mortar) + 20 hours prior to heat-treatment (ball mill) + 10 hours after heat-treatment (automatic mortar) | 400 |

In the above-described procedures, ferrite crystals were produced and deposited by the heat-treatment comprising the steps: the amorphous material was placed in a heat-treatment furnace; and the furnace was heated to 500° C. at a rate of 120° C./hr and maintained at the temperature for 6 hours, heated again to 800° C. at a rate of 120° C./hr, and maintained at the temperature 5 hours, subsequently cooled to room temperature.

The heat-treated material was subjected to etching treatment (treatment for removing glass component, etc.) in which the material was treated with 6N acetic acid (35 vol %) at 90° C. for 4 hours, and washed with water and vacuum dried a6 120° C. for 2 hours to obtain barium ferrite crystal particulate (barium ferrite magnetic particulate).

The coercive force (Hc), saturation magnetization, ratio of width/length (W/L ratio), and specific surface area of the barium ferrite magnetic particulates were measured. The results are set forth in Table 2.

In addition, the barium ferrite magnetic particulate was sufficiently mixed with a binder in a dispersing apparatus according to the conventional manner. Thus produced dispersion was coated on a plastic tape, and the luster on the coated surface was examined by measuring strength of a light reflected by the coated surface upon impingement of white light at 45° on the surface. The results are set forth in Table 2.

TABLE 2

| Ex. | Coercive Force (Hc)(Oe) | Saturation Magnetization (emu/g) | W/L Ratio | Specific Surface Area (m²/g) | Laster of Coated Surface |
|---|---|---|---|---|---|
| 1 | 830 | 55.0 | 0.44 | 24.5 | 1 |
| 2 | 820 | 55.4 | 0.44 | 23.6 | 2 |
| 3 | 840 | 55.7 | 0.47 | 27.2 | 8 |
| 4 | 845 | 55.3 | 0.47 | 27.5 | 12 |
| 5 | 800 | 55.7 | 0.47 | 26.8 | 20 |

In Table 2, the laster of the coated surface of tape is expressed as a numeral estimated with reference to the light strength given in Example 1, in which the greater numeral means that the coated surface showed higher luster. The higher luster means that the magnetic particulate-containing layer contains magnetic particulate well dispersed therein, having smooth surface thereon, and accordingly suggests that the magnetic particulate contained therein has high dispersibility.

COMPARISON EXAMPLES 1-2

The procedure described in Example 1 was repeated except that the pulverization was omitted, to prepare barium ferrite magnetic particulate. Thus obtained magnetic particulate was etched and then subjected to pulverization set forth in Table 3.

TABLE 3

| Com. Example | Pulverization Conditions |
|---|---|
| 1 | 3 hours (automatic mortar) |
| 2 | 15 hours (automatic mortar) |

The coercive force (Hc), saturation magnetization, ratio of width/length (W/L ratio), and specific surface area of the barium ferrite magnetic particulates were measured. The results are set forth in Table 4.

In addition, a mixture of the barium ferrite magnetic particulate and a binder was coated on a plastic tape in the same manner as in Example 1, and the luster on the coated surface was examined in the same manner. The results are set forth in Table 4. In Table 4, the laster of the coated surface of tape is expressed as a numeral estimated with reference to the light strength given in Example 1.

TABLE 4

| Com. Ex. | Coercive Force (Hc)(Oe) | Saturation Magnetization (emu/g) | W/L Ratio | Specific Surface Area (m²/g) | Luster of Coated Surface |
|---|---|---|---|---|---|
| 1 | 870 | 54.7 | 0.47 | 26.3 | 1 |
| 2 | 1000 | 53.5 | 0.47 | 25.4 | 2 |

As seen from the results set forth in Table 4, the barium ferrite magnetic particulate pulverized after removal of the glass component, etc. showed unfavorable elevation of coercive force, and decrease of saturation magnetization.

I claim:

1. A process for the preparation of a magnetoplumbite type ferrite magnetic particulate for magnetic recording which comprises the steps of:

(1) melting a starting material mixture containing a basic component for hexagonal ferrite comprising $Fe_2O_3$ and RO, wherein R is at least one metal atom selected from the group consisting of barium, strontium and lead, a coercive force reducing component comprising MO and $M'O_2$, wherein M is at least one divalent metal atom selected from the group consisting of cobalt, nickel and zinc and M' is at least one tetravalent metal atom consisting of titanium, zirconium and hafnium, and a glass-forming component comprising $B_2O_3$ and $SiO_2$, (2) rapidly cooling the resulting molten mixture to obtain an amorphous material, (3) heat-treating said amorphous material to form ferrite crystals, and (4) removing components other than the ferrite crystals from the material resulting from said heat-treatment;

characterized in that a step for pulverizing said amorphous material under application of shearing force and pressure to give particles passing through a sieve of 170 mesh is included in advance of the step (3) for heat-treating said amorphous material to form ferrite crystals.

2. The process for the preparation of a ferrite magnetic particulate as claimed in claim 1, wherein said starting material mixture contains each component constituting said mixture in such an amount in terms of the oxide that the amount of $B_2O_3+SiO_2$ is from 20 to 40 molar %, that of RO is from 25 to 50 molar %, that of $Fe_2O_3$ is from 20 to 50 molar %, that of MO is from 2 to 10 molar %, and that of $M'O_2$ is from 2 to 10 molar % wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium, wherein the molar ratio of $SiO_2/(B_2O_3+SiO_2)$ is within a range of from 0.05 to 0.8.

3. The process for the preparation of a ferrite magnetic particulate as claimed in claim 1, wherein said starting material mixture contains each component constituting said mixture in such an amount in terms of the oxide or metal that the amount of $B_2O_3+SiO_2$ is from 20 to 40 molar %, that of RO is from 25 to 50 molar %, that of $Fe_2O_3$ is from 20 to 50 molar %, that of MO is from 2 to 10 molar %, that of $M'O_2$ is from 2 to 10 molar %, and that of platinum and/or gold is from 1 to 2,000 ppm based on the combined amount of the above $B_2O_3$, $SiO_2$, RO, $Fe_2O_3$, MO and $M'O_2$, wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium, wherein the molar ratio of $SiO_2/(B_2O_3+SiO_2)$ is within a range of from 0.05 to 0.8.

4. A process for the preparation of a magnetoplumbite type ferrite magnetic particulate for magnetic recording which comprises the steps of:

(1) melting a starting material mixture containing a basic component for hexagonal ferrite comprising $Fe_2O_3$ and RO, wherein R is at least one metal atom selected from the group consisting of barium, strontium and lead, a coercive force reducing component comprising MO and $M'O_2$, wherein M is at least one divalent metal atom selected from the group consisting of cobalt, nickel and zinc and M' is at least one tetravalent metal atom selected from the group consisting of titanium, zirconium and hafnium, and a glass-forming component comprising $B_2O_3$ and $SiO_2$, (2) rapidly cooling the resulting molten mixture to obtain an amorphous material, (3) heat-treating said amorphous material to form ferrite crystals, and (4) removing components other than the ferrite crystals from the material resulting from said heat-treatment;

characterized in that a step for pulverizing said amorphous material under application of shearing force and pressure to give particles passing through a sieve of 170 mesh is included in advance of the step (3) for heat-treating said amorphous material to form ferrite crystals and a step for pulverizing said heat-treated amorphous material containing ferrite crystals under application of shearing force and pressure is included in advance of the step (4) for removing components other than the ferrite crystals from the heat-treated material.

5. The process for the preparation of a ferrite magnetic particulate as claimed in claim 4, wherein said starting material mixture contains each component constituting said mixture in such an amount in terms of the oxide that the amount of $B_2O_3+SiO_2$ is from 20 to 40 molar %, that of RO is from 25 to 50 molar %, that of $Fe_2O_3$ is from 20 to 50 molar %, that of MO is from 2 to 10 molar %, and that of $M'O_2$ is from 2 to 10 molar % wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium, wherein the molar ratio of $SiO_2/(B_2O_3+SiO_2)$ is within a range of from 0.05 to 0.8.

6. The process for the preparation of a ferrite magnetic particulate as claimed in claim 5, wherein said starting material mixture contains each component constituting said mixture in such an amount in terms of the oxide or metal that the amount of $B_2O_3+SiO_2$ is from 20 to 40 molar %, that of RO is from 25 to 50 molar %, that of $Fe_2O_3$ is from 20 to 50 molar %, that of MO is from 2 to 10 molar %, that of $M'O_2$ is from 2 to 10 molar %, and that of platinum and/or gold is from 1 to 2,000 pprm based on the combined amount of the above $B_2O_3$, $SiO_2$, RO, $Fe_2O_3$, MO and $M'O_2$, wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium, wherein the molar ratio of $SiO_2/(B_2O_3+SiO_2)$ is within a range of from 0.05 to 0.8.

* * * * *